United States Patent

Nakahira et al.

[11] Patent Number: 5,930,507
[45] Date of Patent: Jul. 27, 1999

[54] COMPILING PROCESSING APPARATUS

[75] Inventors: Tadashi Nakahira; Masakazu Hayashi, both of Kawasaki, Japan

[73] Assignee: Fujitsu Limited, Kawasaki, Japan

[21] Appl. No.: 08/655,384

[22] Filed: May 30, 1996

[30] Foreign Application Priority Data

May 30, 1995 [JP] Japan .................................. 7-132104

[51] Int. Cl.⁶ ...................................................... G06F 9/45
[52] U.S. Cl. .......................................... 395/705; 395/709
[58] Field of Search ................................. 395/704, 705, 395/708, 709, 706, 707, 383, 588

[56] References Cited

U.S. PATENT DOCUMENTS 5,581,762  12/1996  Hayashi et al. ......................... 395/709
5,613,121   3/1997  Blainey .................................... 395/709
5,689,712  11/1997  Heisch ..................................... 395/704

FOREIGN PATENT DOCUMENTS 3-282734  12/1991  Japan .

OTHER PUBLICATIONS

Lam, Monica S., et al., The Cache Performance and Optimizations of Blocked Algorithm, ASPLOS–IV Proceedings, pp. 63–75, Apr. 8, 1991.

*Primary Examiner*—Tariq R. Hafiz
*Assistant Examiner*—Kakali Chaki
*Attorney, Agent, or Firm*—Staas & Halsey, LLP

[57] ABSTRACT

A compiling processing apparatus which compiles a program operating in a computer having a cache memory. This apparatus collects memory access data for the cache memory, analyzes confliction relationships between them, determines whether or not an instruction for confliction memory access data relocates, relocates the instruction if relocation is possible, and reduces the number of cache miss. Further, this apparatus recognizes memory access data in a continuous area, audits recognized memory access data alignment, generates an instruction of pair-load/pair-store, and reduces the number of memory accesses.

7 Claims, 17 Drawing Sheets

| ACCESS TO MEMORY | CACHE CONDITION | CONFLICTION CONDITION |
|---|---|---|
| X(JX,K) FETCHING | X(JX−1,K) IS STORED IN CACHE TOGETHER | MISS−HIT |
| Y(JX,K) FETCHING | Y(JX−1,K) IS STORED IN CACHE TOGETHER FETCHING X(JX,K), X(JX−1,K) FROM CACHE | MISS−HIT |
| X(JX−1,K) FETCHING | FETCHING Y(JX,K), Y(JX−1,K) FROM CACHE | MISS−HIT |
| Y(JX−1,K) FETCHING | FETCHING X(JX−1,K) FROM CACHE | MISS−HIT |

FIG. 3A

| BEFORE CHANGING | AFTER CHANGING | CACHE CONDITION |
|---|---|---|
| FETCHING X(JX,K) | FETCHING X(JX,K) | MISS−HIT |
| FETCHING Y(JX,K) | FETCHING X(JX−1,K) | HIT |
| FETCHING X(JX−1,K) | FETCHING Y(JX,K) | MISS−HIT |
| FETCHING Y(JX−1,K) | FETCHING Y(JX−1,K) | HIT |

FIG. 3B

| | | | |
|---|---|---|---|
| L1 | ldd | [gr1-1032], fr12 | !X(JX,K) |
| L2 | ldd | [gr5-1024], fr14 | |
| L3 | fmuld | fr14, fr12, fr14 | |
| L4 | ldd | [gr5-1032], fr16 | |
| L5 | fsubd | fr16, fr14, fr14 | |
| L6 | ldd | [gr0-1032], fr18 | !Y(JX,K) |
| L7 | ldd | [gr5-1016], fr20 | |
| L8 | fmuld | fr20, fr18, fr20 | |
| L9 | fsubd | fr14, fr20, fr20 | |
| L10 | std | fr20, [gr5-1032] | !F(JX,K,1) |
| L11 | ldd | [gr7-4080], fr22 | |
| L12 | fmuld | fr22, fr12, fr22 | |
| L13 | ldd | [gr7-4088], fr24 | |
| L14 | fsubd | fr24, fr22, fr22 | |
| L15 | ldd | [gr7-4072], fr26 | |
| L16 | fmuld | fr26, fr18, fr26 | |
| L17 | fsubd | fr22, fr26, fr26 | |
| L18 | std | fr26, [gr7-4088] | !F(JX,K,2) |
| L19 | ldd | [gr6-4080], fr28 | |
| L20 | fmuld | fr28, fr12, fr12 | |
| L21 | ldd | [gr6-4088], fr30 | |
| L22 | fsubd | fr30, fr12, fr12 | |
| L23 | ldd | [gr6-4072], fr0 | |
| L24 | fmuld | fr0, fr18, fr18 | |
| L25 | fsubd | fr12, fr18, fr18 | |
| L26 | std | fr18, [gr6-4088] | !F(JX,K,3) |
| L27 | ldd | [gr1-1040], fr2 | !X(JX-1,K) |
| L28 | ldd | [gr5-1032], fr4 | |
| L29 | fmuld | fr4, fr2, fr4 | |
| L30 | ldd | [gr5-1040], fr6 | |
| L31 | fsubd | fr6, fr4, fr4 | |
| L32 | ldd | [gr0-1040], fr8 | !Y(JX-1,K) |
| L33 | ldd | [gr5-1024], fr10 | |
| L34 | fmuld | fr10, fr8, fr10 | |
| L35 | fsubd | fr4, fr10, fr10 | |
| L36 | std | fr10, [gr5-1040] | !F(JX-1,K,1) |
| L37 | ldd | [gr7-4088], fr12 | |

FIG. 4

```
if (UseCascade) {
   for (i = EarLength-1; i>0 ; i--)
      InputState [i] = InputState [i-1] ; ---
                              (MAXIMUM LOOP / HIGH EXECUTION
                                                    COST)
   a(i-1), a(i),   a(i+1), a(i+2), ...
      ↓      ↓       ↓       ↓
   a(i)  , a(i+1), a(i+2), a(i+3), ...
```

FIG. 5A

```
ld    [gr1-4 ] , fr0
ld    [gr1-8 ] , fr1
ld    [gr1-12] , fr2
ld    [gr1-16] , fr3
ld    [gr1-20] , fr4
ld    [gr1-24] , fr5
ld    [gr1-28] , fr6
ld    [gr1-32] , fr7
st    fr0, [gr2]
st    fr1, [gr2-4 ]
st    fr2, [gr2-8 ]
st    fr3, [gr2-12]
st    fr4, [gr2-16]
st    fr5, [gr2-20]
st    fr6, [gr2-24]
st    fr7, [gr2-28]
         :      :
``` source program

```
for(i=1; i < 100 ; i++) {
   b[i] = a[i-1] ;
}
```

FIG. 5B

```
ldd     [gr1-4 ] , %fr0
ldd     [gr1-12] , %fr2
ldd     [gr1-20] , %fr4
ldd     [gr1-24] , %fr6
st      fr0 , [gr2 ]
st      fr1 , [gr2-4 ]
st      fr2 , [gr2-8 ]
st      fr3 , [gr2-12]
st      fr4 , [gr2-16]
st      fr5 , [gr2-20]
st      fr6 , [gr2-24]
st      fr7 , [gr2-28]
```

FIG. 6A

```
ld      [gr1-4 ] , fr0
ld      [gr1-8 ] , fr1
ld      [gr1-12] , fr2
ld      [gr1-16] , fr3
ld      [gr1-20] , fr4
ld      [gr1-24] , fr5
ld      [gr1-28] , fr6
ld      [gr1-32] , fr7
std     fr0 , [gr1 ]
std     fr2 , [gr1-8 ]
std     fr4 , [gr1-16]
std     fr6 , [gr2-24]
```

FIG. 6B

```
[SOURCE PROGRAM]      [INTERMEDIATE LANGUAGE]
  DO I = 1,100
     A(I) = 0          STORE AXD(A),0  → INITIAL NUMBER : 0
     B(I) = 0          STORE AXD(B),0  → INITIAL NUMBER : 0
  CONTINUE
```

FIG. 13

```
[SOURCE PROGRAM]      [INTERMEDIATE LANGUAGE]
  DO I = 1,100,2
    A(I)   = 0        STORE AXD(A:I)  ,0  → INITIAL NUMBER      :0
    A(I+1) = 0        STORE AXD(A:I+1),0  → CONTINUOUS NUMBER:1
    B(I)   = 0        STORE AXD(B:I)  ,0  → INITIAL NUMBER      :0
    B(I+1) = 0        STORE AXD(B:I+1),0  → CONTINUOUS NUMBER:1
  CONTINUE
```

FIG. 14

```
[SOURCE PROGRAM]      [ INTERMEDIATE LANGUAGE ]
   DO I = 1,100,2
      A(I+1) = 0       STORE AXD(A:I+1),0  →  INITIAL  NUMBER : 1
      A(I+2) = 0       STORE AXD(A:I+2),0  →  INITIAL  NUMBER : 2
   CONTINUE
```

FIG. 15A

```
[SOURCE PROGRAM]      [ INTERMEDIATE LANGUAGE ]
   DO I = 1,100,4
      A(I+1) = 0       STORE AXD(A:I+1),0  →  INITIAL  NUMBER : 1
      A(I+2) = 0       STORE AXD(A:I+2),0  →  INITIAL  NUMBER : 2
      A(I+3) = 0       STORE AXD(A:I+3),0  →  CONTINUOUS NUMBER : 3
      A(I+4) = 0       STORE AXD(A:I+4),0  →  CONTINUOUS NUMBER : 4
   CONTINUE
```

FIG. 15B

```
LOAD   CTD (pair1, pair2), BXD( )   ← PAIR-LOAD 8 (OR 16)- BYTE
                                       CONTINUOUS AREA
         :  :
STORE  BXD( )     ,pair1            ← STORE INDIVIDUALLY
                                       4 (OR 8) BYTES BY
STORE  BXD(+4)   ,pair2                4 (OR 8) BYTES
CTD : COMPOUND TEMPORARY NAME
```

FIG. 16A

```
LOAD   pair1, BXD( )                ← LOAD INDIVIDUALLY
LOAD   pair2, BXD(+4)                  4 (OR 8) BYTES BY
         :  :                          4 (OR 8) BYTES
STORE  BXD( ) , CTD(pair1,pair2)    ← PAIR-STORE 8 (OR 16)- BYTE
                                       CONTINUOUS AREA
CTD : COMPOUND TEMPORARY NAME
```

FIG. 16B

```
LOAD   CTD(pair1,pair2), BXD( )     ← PAIR-LOAD 8 (OR 16)- BYTE
                                       CONTINUOUS AREA
         :  :
STORE  BXD( ), CTD(pair1,pair2)     ← PAIR-STORE 8 (OR 16)- BYTE
                                       CONTINUOUS AREA
CTD : COMPOUND TEMPORARY NAME
```

FIG. 16C

COMPILING PROCESSING APPARATUS

BACKGROUND OF THE INVENTION

FIELD OF THE INVENTION

The present invention relates to a compilation system for compiling memory access data at a high speed to advance an optimization effect of a memory access by a compiler having an optimization function. More particularly, the present invention relates to a compile process apparatus suitable for increasing an execution performance of a compiled program and for decreasing the number of memory accesses. This apparatus solves a confliction of data in a cache memory through analysis, when compiling the data.

The recently developed RISC processor is mainly composed of a superscalar processor, and is capable of performing more than one instruction per clock cycle. The size of a cache memory installed within a processor tends to increase year by year, requiring a high performance compiler for extracting optimum performance from the a RISC processor with such a cache memory. An optimization method considering the cache memory has recently been noted among various methods.

(Reference: The Cache Performance and Optimizations of Blocked Algogorithms, Monica S Lam 1991 ASPLOS-IV Proceedings).

Before explaining the conventional technology, the terminology related to the present invention is first explained.

1) Vector load/store

A general vector load/store loads and stores the data with a predetermined vector length as a group. The data subjected to being loaded/stored as a group with regard to a scalar calculation, comprises 16 bytes as a maximum, in an architecture capable of performing a quadruple-precision memory access.

2) Direct-mapped cache memory

The direct-mapped cache memory comprises a cache memory in which the correspondence between a main memory and the cache memory is determined. The remainder from the division of an address of the main memory by a cache size, corresponds to the address of the cache memory. Data whose address difference is an integer-multiple of the cache size cannot reside in the cache memory simultaneously, and conflict with each other, resulting in a decrease in processor performance.

3) N sets associative cache memory

This is a cache memory obtained by development of the direct-mapped cache memory. Simply speaking, this cache memory can be explained as N sets of the direct-mapped cache memory.

4) 64-byte cache line length

This refers to a method of performing a data transfer between a main memory and a cache memory in units of 64 bytes. When a first unit of data is stored in the cache memory, adjacent data is also stored in the cache memory together with the first unit of data. Thus the number of the memory accesses decreases when the line length increases, thereby speeding up the processor operation. However, in case of a direct-mapped cache memory whose size is 256 KB, data with an address difference of 256 KB+32 B cannot reside in the cache memory simultaneously, thereby causing a decrease in performance. Thus, it is not recommended to simply increase the line length. When the line length increases, the number of lines decreases and thus the possibility that the data different from each other by the cache size, which cannot be stored in the cache memory, increases. Thereby, the performance of processor operation decreases.

5) The number of entries in the cache memory.

The number of entries refers to how many lines are included within one set of the cache memory. In the case of a direct-mapped cache memory of 256 KB with a line length of 64 bytes, the number of entries in the cache memory is equal to 4096.

6) 8 bytes/16 bytes alignment

In the case where the area assigned to the memory access data is an area where the remainder obtained by dividing the actual address for the area by 8 or 16 is 0, the memory access data is called data having an alignment of 8 bytes data or 16 bytes data. When a RISC processor accesses an area for which the remainder obtained by dividing the actual address of the area by 8 or 16 is not equal to 0, an alignment error may occur.

7) Source information

When a compiler converts a program to an intermediate language, the program information stored at the same time is called the source information. The most general type of source information is a subscript of a matrix element. As the memory access is usually expressed by using a base register, an off-set and an index-register, the information of the subscript of the matrix element is meaningless when a hard-ware instruction is processed.

According to recent optimization technologies for a compiler, such as the blocking technology, the execution of a program is speeded up by maintaining data in a cache memory. However, the conventional optimization technology has the following drawbacks.

1) The cases to which these optimization technologies can be applied are rare, and thus these optimization technologies are not always effectively used in actual programs.

2) When these optimization technologies are not applied, cache misses occur frequently, thereby decreasing the performance.

3) According to another conventional technology, a space is inserted in the actual addresses for the memory access data, to prevent conflicts on the same line of the cache memory upon accessing the memory. As this is represented by a COMMON block in FORTRAN, it is sometimes impossible to insert a space in a continuous area, due to the language specification. In this case, a conflict occurs in the cache memory, thereby decreasing the performance.

A method for instruction scheduling for detecting the data subjected to a cache miss, and hiding the cache miss, is disclosed in the Japanese patent disclosure Hei 3-28273 publication (An Instruction Arrangement Optimization). This publication does not disclose a method of solving a cache miss.

A method of reducing the time of a memory accesses for a continuous area has the following problems.

4) The process of determining a continuous area and of accessing an area for a two time memory access at one-time by using a pair register, is not conducted by the present compile process apparatus.

5) In order to realize a reduction in the number of memory accesses for a continuous area, the loop of the program should be expanded several times to increase the continuous access, or to detect the continuous area. Such optimization is not used due to the complexity encountered upon expanding an instruction loop or the complexity of an interface.

6) When the double precision type data frequently used for FORTRAN is stored in a register, a 32 bit register is required. In this case, a 64 bit register and quadruple-precision memory access instructions are required to access the double precision type data at one time. Most of the current RISC processors are designed for 32 bit operation, and at the present stage of transferring from 32 bit to 64 bit RISC processors, implementation itself has not yet been realized.

SUMMARY OF THE INVENTION

An object of the present invention is to analyze the data which conflict with each other in a cache memory upon compilation, thereby solving the conflict of the data and reducing the time of a memory access, to improve the execution capability of a compiled program.

A cache memory comprises a memory which can be accessed during one clock cycle, and which can be accessed at a speed approximately 30 times higher than the access speed for the main memory. If the cache memory keeps the data without a cache miss, high speed access to the memory is always possible. However, as the capacity of the cache memory is limited, it is impossible to maintain both old data and new data. Therefore, when a confliction of data occurs in the cache memory, the most recent data is stored in the cache memory, and the old data is deleted from the cache memory. If the conflicted memory access data is analyzed upon compiling the data, the number of cache misses can be reduced by changing the order of accessing the memory access data.

A RISC processor frequently has a bottleneck in the capability for a memory access through which the data is supplied to an arithmetic logic unit (ALU). Therefore, the performance of a RISC processor can be improved by reducing the time of memory accesses as far as possible. It is generally adopted to reduce the number of memory accesses through an optimization process conducted by a compiler. A method of reducing the time of memory accesses, according to the present invention, is to realize a reduced scale operation of a vector (pair) load/store in which the data is read from a continuous area as a group, and the data is written into a continuous area as a group, when a memory access to the continuous area takes place.

The above two points can be applied to a general purpose microprocessor as well as to obtain a RISC processor, to high performance.

BRIEF DESCRIPTION OF THE DRAWINGS

FIGS. 2A and 2B show original source program written in FORTRAN for explaining a compiling method for reducing the number of cache miss operations;

FIGS. 3A and 3B show views of the data status in the cache memory in accordance with the program shown in FIG. 2

FIG. 4 shows an object code (assembler source) when a method of compiling data to reduce the number of cache miss operations is actually conducted;

FIGS. 5A and 5B exemplify programs for memory access to a continuous area;

FIGS. 6A and 6B show object code (assembler source) when a compiling method for reducing the time of a memory access to a continuous area is conducted;

FIG. 13 exemplifies a source program and its intermediate text for explaining an optimization according to the present invention;

FIG. 14 exemplifies a source program and its intermediate text for explaining an optimization according to the present invention;

FIGS. 15A and 15B exemplify a source program and its intermediate text for explaining an optimization according to an embodiment of the present invention;

FIGS. 16A, 16B and 16C show examples of a pattern of generation of a pair load/pair store.

DETAILED DESCRIPTION OF THE EMBODIMENT

Figure 1:
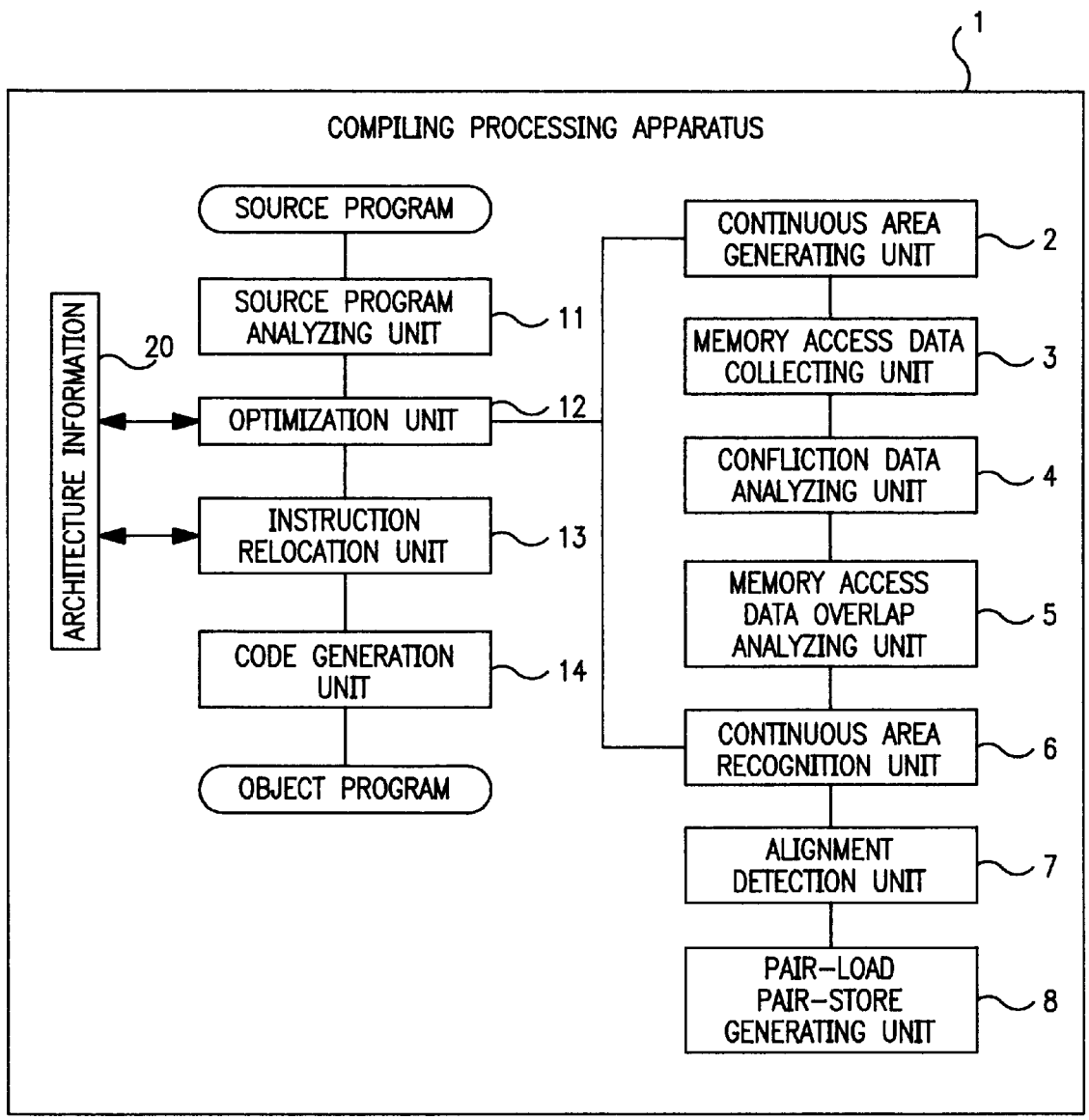
FIG. 1 shows a block diagram of a principle of the present invention.

FIG. 1 shows a principle of the present invention. A compiling processing apparatus 1 comprises a source program analyzing unit 11 for analyzing a source program to generate an intermediate language, an optimization unit 12 for performing an optimization process, an instruction relocation unit 13 for relocating an instruction based on a result of an operation of the optimization unit 12, and a code generating unit 14 for generating code based on a result of an operation of the optimization unit 12. The following units are provided for the optimization unit 12 as a main portion of the present invention.

The continuous area generating unit 2 increases the amount of data to be accessed in the continuous area of the memory by applying a loop unrolling process to an optimization process when the compilation of the program is performed.

The memory access data collecting unit 3 collects memory access data after the amount of the data to be accessed in the continuous area of the memory is increased by using the continuous area generating unit 2.

The confliction data analyzing unit 4 analyzes a confliction relationship in the cache memory among memory access data, when the data to be accessed in the memory is collected by the memory access data collecting unit 3.

A memory access data overlap analyzing unit 5 determines, based on the result of the analysis of the confliction data obtained from the confliction data analyzing unit 4, whether movement of an instruction is permitted with regard to the data to be accessed and conflicted in the cache memory.

The continuous area recognizing unit 6 recognizes the data to be accessed in the continuous area of the memory when the optimization is applied to the compilation of the program.

The alignment detecting unit 7 detects the alignment of the data to be accessed in the continuous area in the memory, when the continuous area is recognized by the continuous area recognizing unit 6.

A pair load and pair store generating unit 8 generates a pair load or store by treating an instruction to load or store in the cache memory a plurality of memory access data to be accessed in the continuous area, as an instruction to load or store in the cache memory a single memory access data to be accessed in the continuous area, based on the result of the detection of the alignment obtained by the alignment detecting unit 7.

The instruction relocation unit 13 relocates the instruction, based on a result of the overlap analysis by the memory access data over-lapping analyzing unit 5 of the data to be accessed in the cache memory, so that the number of cache miss hits is reduced with regard to the memory access data conflicted in the cache memory.

In FIG. 1, the continuous area generating unit 2, the memory access data collecting unit 3, the confliction data analyzing unit 4, and the memory access data over-lap analyzing unit 5, constitute the means for reducing the number of cache miss hits according to a first feature of the present invention. The continuous area recognizing unit 6, the alignment detecting unit 7 and the pair load and pair store generating unit 8 constitute the means for reducing the time of memory accesses to the continuous area according to a second feature of the invention.

1. A compiling method for reducing the number of cache misses.

The present invention does not always maintain the memory access data in the cache memory, such as in the blocking operation, but maintains the memory access data in the cache memory for as long as possible until the data maintained in the cache memory is used once.

The compiling method for reducing the number of cache misses according to the first embodiment of the invention will be explained by the following examples.

Figures 2A, 2B:
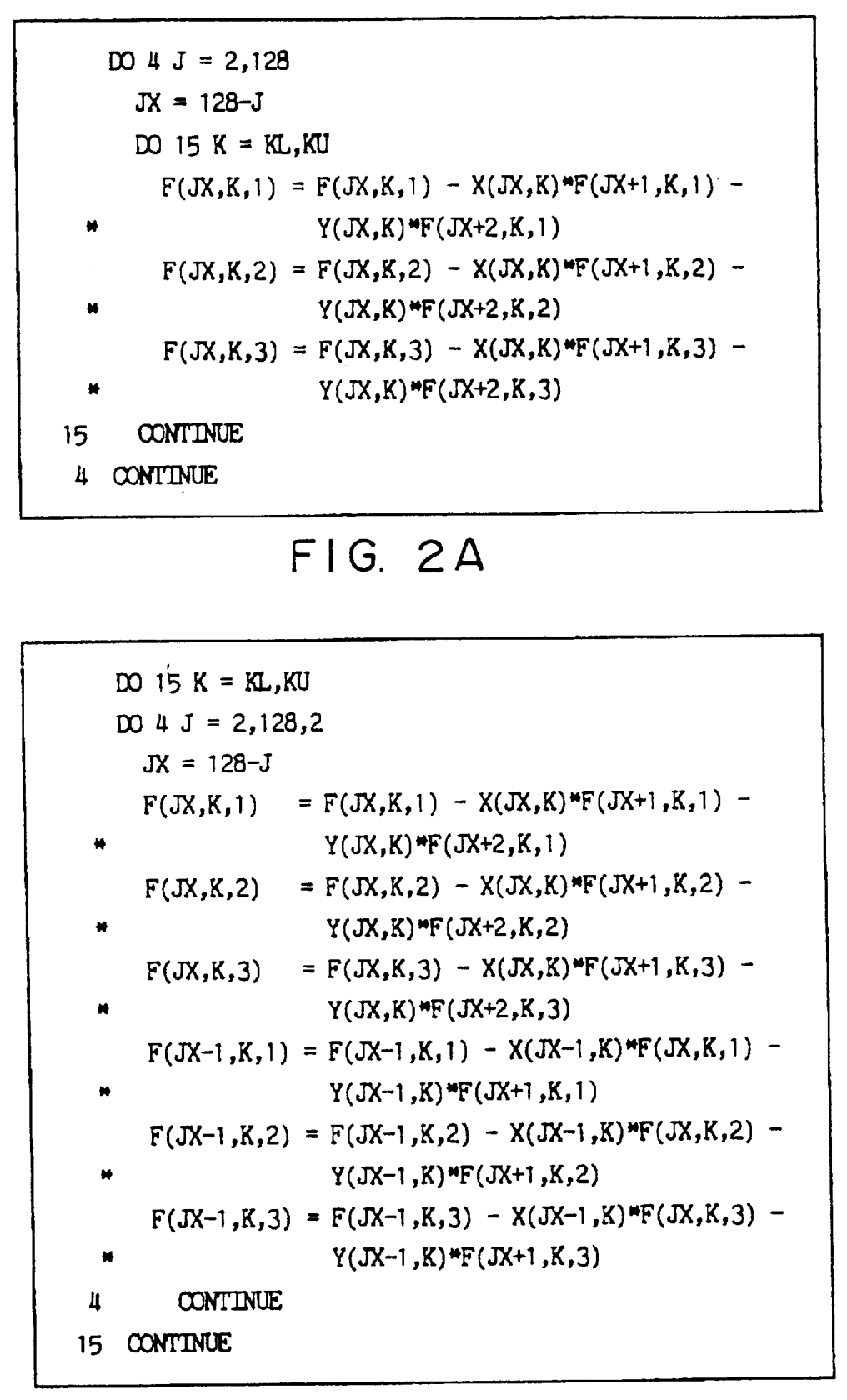

FIG. 2 (A) shows an original source program.

The FORTRAN program loop shown in FIG. 2 (A) exchanges the Index J and K in the loop index exchanging process according to an optimization in the compiler. Further, the inner-most loop is unrolled twice according to a loop unrolling. FIG. 2 (B) shows the text obtained after the index exchange is performed and the most-inner loop is unrolled twice (according to the loop unrolling process), is expressed as the source program.

The array elements, X (JX, K), X (JX−1, K), Y (JX, K), and Y (JX−1, K) are used. It is assumed that the array elements X (JX, K), Y (JX, K) and the array elements X (JX−1, K), Y (JX−1, K) are respectively assigned to different areas in the real addresses of the main memory, but are stored in the same line in the cache memory. The order of the memory accesses is as follows, 1) a load instruction X (JX, K)
2) a load instruction Y (JX, K)
3) a load instruction X (JX−1, K)
4) a load instruction Y (JX−1, K)

When the data of a particular address is loaded to the cache memory, the data of the adjacent address are simultaneously stored. The number of the data to be simultaneously stored depends on the line length of the cache memory.

When the line length of the cache memory is 32 bytes, four array elements (in the case of double precision data) can be stored in the cache memory based on a single load instruction. The operation of the cache memory is shown in FIGS. 3, when the respective array elements shown in the above items 1 to 4 are accessed.

FIG. 3 (A) shows a relationship between the memory access and the cache memory for the change of the memory access data. FIG. 3 (B) shows the relationship between the re-arrangement of the memory access data and the cache memory. It is important to re-arrange respective array elements so that a cache miss will not be caused when the cache memory is accessed. By changing the order of the accesses to the array elements shown in FIG. 3 (A) to that shown in FIG. 3 (B), conflicts in the cache memory are also suppressed. All four memory accesses to the respective array elements, before the order-change shown in FIG. 3 (A), result in cache misses in the cache memory. However, by re-arranging the load instructions as shown in FIG. 3 (B), the number of cache misses in the cache memory can be reduced to two misses.

FIG. 4 shows the assembler source code when the access order of the respective array elements is re-arranged. In FIG. 4, grx shows a general purpose register, ldd, a double precision load instruction, fsubd, a double precision substraction, frx, a floating point register, std, a double precision store, and fmuld, a double precision multiplication. In FIG. 4, a load instruction of X (JX−1, K) in line L27 is moved to be after a load instruction of X (JX, K) in line L1, and a load instruction Y (JX−1, K) in line L32 is moved to be after a load instruction of Y (JX, K) in line L6. This will result in a reduction of the number of cache misses as shown in FIG. 3 (B).

2. A compiling method for reducing the time of memory accesses to a continuous area.

A compilation method reduces the time of a memory access to a continuous area according to the second embodiment of the invention. The method reduces the number of the actual memory accesses by loading single precision memory access data or double precision type memory access data into a double precision register or a quadruple-precision register, respectively. Alternatively, the time is reduced by storing single precision memory access data or double precision type memory access data into the double precision register and the quadruple-precision register, respectively.

FIGS. 5A and 5B show examples of a program for a memory access to a continuous area. In FIG. 5 (A), all of the array elements comprise single precision data. Conventionally, a data transfer between the memory areas as shown in FIG. 5 (A) is performed by loading a single array element and storing a single array element as shown in FIG. 5 (B). This operation is performed
  1) by loading two array elements as one set and storing each array element, or
  2) by loading each array element and storing two array elements as one set.

Based on the above operation, the number of memory accesses can be reduced.

FIGS. 6A and 6B show examples of optimizing a memory access to a continuous area by using the compiling method according to the second embodiment of the present invention. FIG. 6 (A) shows an example in which two array elements are loaded as one set and each array element is stored separately, as recited in the above item 1). FIG. 6 (B) shows an example in which each array element is loaded separately and two array elements are stored as one set, as recited in the above item 2).

It is determined, according to the memory alignment of respective array elements in the real address, whether method 1 or 2 is selected. For example, when the method for loading the data in the double precision register shown in FIG. 6A is selected, the array elements accessed by the head of the load instruction within the loop, is not allocated to the 8 bytes of the head alignment, resulting in an alignment error. In this case, the method shown in FIG. 6B should be used to access the continuous area.

According to the present invention, the number of cache misses is reduced by detecting the confliction relationship of the memory access data in the cache memory, and by moving the instructions and appropriated model. The number of memory accesses can be reduced by applying the optimization of the memory access to the continuous area.

DESCRIPTION OF THE PREFERRED EMBODIMENT

Preferred embodiments of a compilation method of reducing the number of cache misses in a compiling processing apparatus, and a compilation method of reducing memory accesses to a continuous area, are explained in the following.

1. The compiling method for reducing the number of cache misses:

An optimization is executed in a step in which a program is converted to an intermediate language by a source program analyzing unit 11.

Procedures are executed in the following steps (1) to (7).
(1) Execution of loop expansion for increasing the amount of continuous data
(2) Collection of memory access data
(3) Registration and calculation of a line number in a cache memory
(4) Analysis of confliction relations in the cache memory
(5) Analysis of duplication for relocating memory access data
(6) Procedure of allocating a register to the memory access
(7) Procedure of relocating an instruction for the memory access data causing conflict in the cache memory The above steps (1) to (7) will be explained in detail.

(1) Execution of loop unrolling for increasing the amount of continuous data

The loop unrolling is executed to increase the amount of continuous memory access data. In the case of a multiple expansion of a loop of a program, the number of loop unrolling is determined by considering the number of operations and the number of registers in order for the data not to conflict in the register. Here, this procedure is one of well-known optimization procedures known as the loop unrolling processing. In this invention, this procedure is not only used for the purpose of speeding-up processing by reducing the number of loops, but also for increasing the size of a continuous area to be accessed.

(2) Collection of memory access data

Memory access data to be collected are limited to array elements whose addresses in a loop of a program can be recognized statistically by a compiler.

(a) The following information is collected for all array elements in the loop addresses in an intermediate file collection of addressing information 1 (base, index, real value)

collection of addressing information 2 (source information: subscript elements etc.)

collection of array allocation information (area type, allocation position, sequence)

Figure 7:
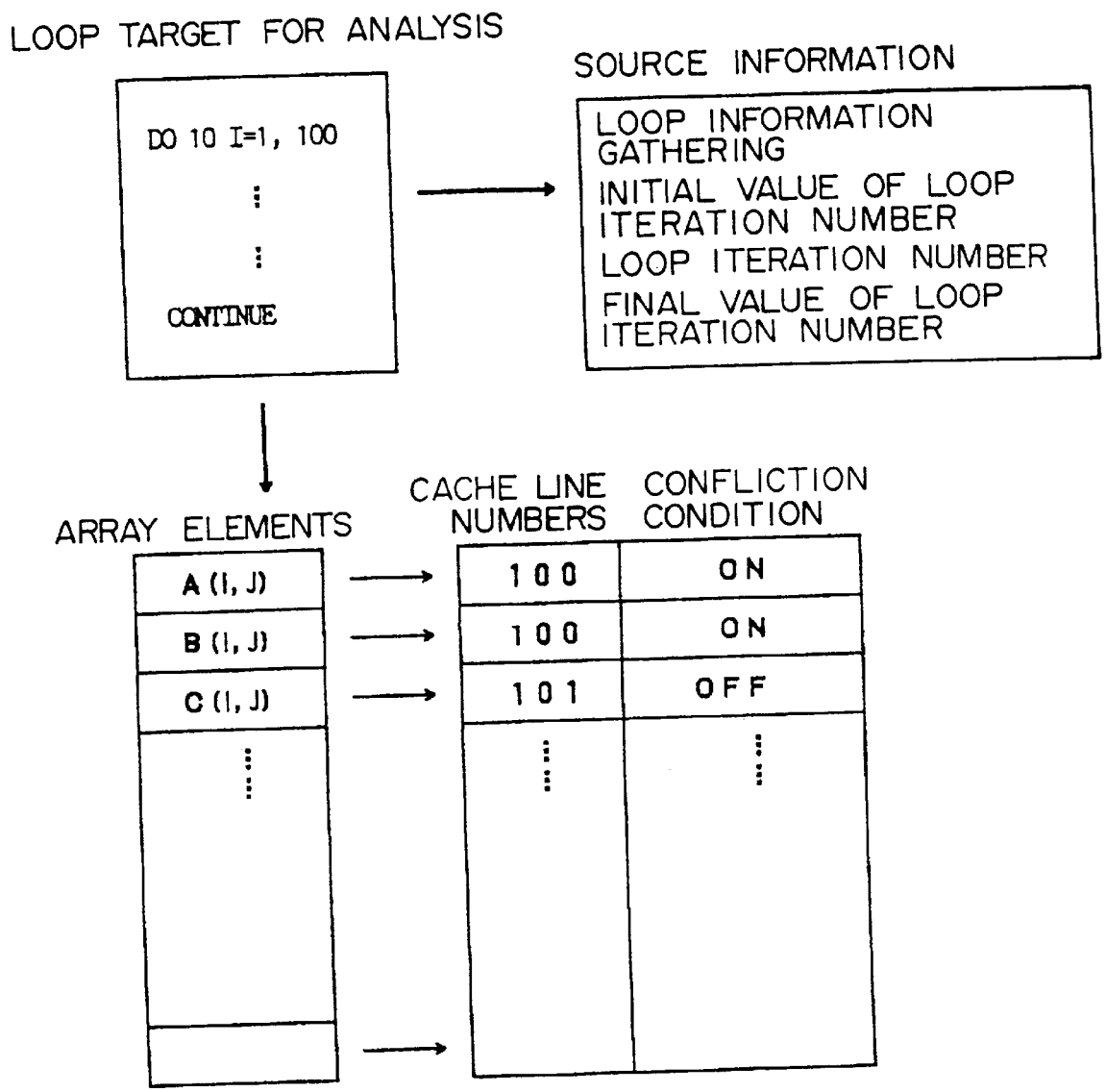
FIG. 7 shows the location in which information is stored and the data structure, to analyze a conflict relationship in the cache memory.

(b) The required loop information (source information) is collected.

initial value of a loop iteration number end value of a loop iteration number increment value of the loop These collected data are stored in an information table shown in FIG. 7.

(3) Registration and calculation of the line number in a cache memory

The compiling processing apparatus calculates the line number in the cache memory in which memory access data collected in the loop are stored. One of the following methods (a)~(e) is applied for calculation according to the collected contents of architecture information.

(a) In the case of succeeding in collecting all information
    calculating byte an address for an array element which corresponds to the first loop iteration
    finding a cache address based on expression 1 (below). This address is defined as the cache memory address. The data is stored in a line which is determined by adding 1 to a quotient obtained by dividing the cache memory address by a cache line size based on expression 2 (below). Further, the remainder is used for calculating a byte position at which the data are stored in the line.

$$\text{C-ADDR} = \text{ARRAY-ADDR MOD (CACHE-LINE-SIZE*CACHE-ENTRY-SIZE)} \quad (1)$$

ARRAY-ADDR      byte number for the address of each array element which corresponds to the first iteration of the loop of the program
CACHE-LINE-SIZE      cache memory line size
CACHE-ENTRY-SIZE      cache memory entry size
C-ADDR      cache memory address $$\text{LINE} = (\text{C-ADDR} / \text{CACHE-LINE-SIZE}) + 1 \quad (2)$$

LINE      line number

Cache memory line size, cache memory entry size, and cache size are given as architecture information when compiling.

(b) In the case of loop initial value uncertainty (impossible to analyze statistically)

The analysis method described in the above case (a) is applied by assuming the loop initial value to be 1.

(c) In the case of loop incremented value uncertainty

First of all, it is checked whether or not the incremented value is changed with each loop-iteration. The analysis method in the above case (a) is applied by forecasting the incremented value when the incremented value is constant within the loop. The analysis method is not applied if the incremented value has the possibility of changing with each loop-iteration.

(d) In the case of array element source uncertainty

In this case, the loop initial value should not be an uncertainty. The value of an uncertain portion should be the lowest value for each dimension of array elements, and the analysis method in the above case (a) is applied.

(e) In the case of not being array elements, or not being cases (a)~(d)

In this case, within the cache memory is not applied because architecture information as source information is uncertain.

[line number calculation in the cache memory]

Processing examples are shown in the following, when this analysis method is applied to the program shown in FIG. 2.

From the parameters for the compiling processing unit or architecture information provided from a system table, the configuration of the cache memory is assumed to be as follows.

direct mapped
cache size: 128 KB
cache line size: 32 B
cache entry number: 4096

Figure 9:
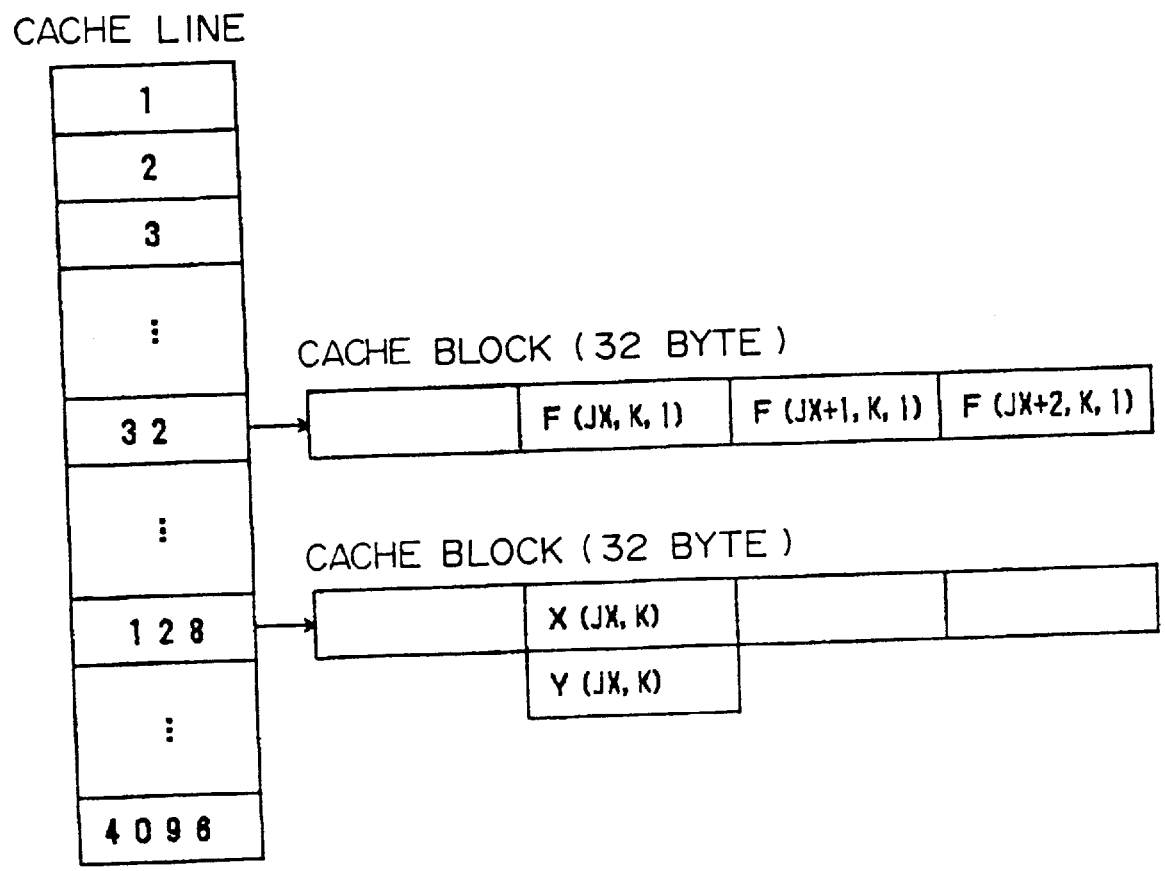
FIG. 9 shows each array element and a conflict relationship in the cache memory.

F(), X(), and Y() are assumed to be a double precision array and are allocated in a memory in the order of F(), X(), and Y(). F(1, 1, 1) is assumed to be 0 (origin). Initial value, end value, and incremented value of the loop are determined respectively when compiling. Line numbers in the cache memory for each array element calculated by the above described cache memory configuration are as follows. The confliction relationship in the cache memory is shown in FIG. 9.

```
F(JX, K, 1) = F(1, 1, 1) + 125 * 8 = 1000
    1000 mod (32 * 4096) = 1000
    1000/32 = 31.25 = 32 lines
F(JX + 1, k, 1) = F(127, 1, 1) + 126 * 8 = 1008
    1008 mod (32 * 4096) = 1008
    1008/32 = 31.5 32 lines
F(JX + 2, K, 1) = F(128, 1,1) = F(1, 1, 1) + 127 * 8 = 1016
    1016 mod (32 * 4096) = 1016
    1016/32 = 31.25 = 32 lines
F(JX, K, 2), = F(126, 1, 2) = F(1, 1, 1) + (125 + 1 * 128 * 128) * 8 = 132072
    132072 mod (32 * 4096) = 1000
    1000/32 = 31.25 = 32 lines
X(JX, KY = X(126, 1) = F(128, 128, 3) + X(1, 1) + 125 * 8
    396288 + 125 * 8 = 397288
    397288 mod (32 * 4096) = 4072
    4072/32 = 127.25 = 128 lines
```

As indicated above, cache memory line numbers for the analyzed memory access data are registered in an information table shown in FIG. 7.

FIG. 7 is an explanatory view of an information storage area and data structure. As shown in FIG. 7, loop information, such as an initial value of a loop iteration number, increment value of the loop, and loop iteration numbers, and an end value of loop iteration numbers, are collected, during compilation, from the loop of the program which should be analyzed, and stored in the information table as source information, and the confliction condition is checked based on a cache line number for each array element. For example, array elements A(I, J) and B(I, J) are in the confliction relationship in which each cache line number is 100, so the confliction condition flag becomes ON. C(I, J) has no confliction relationship to any array element, so the conflict condition flag becomes OFF.

Figure 8:
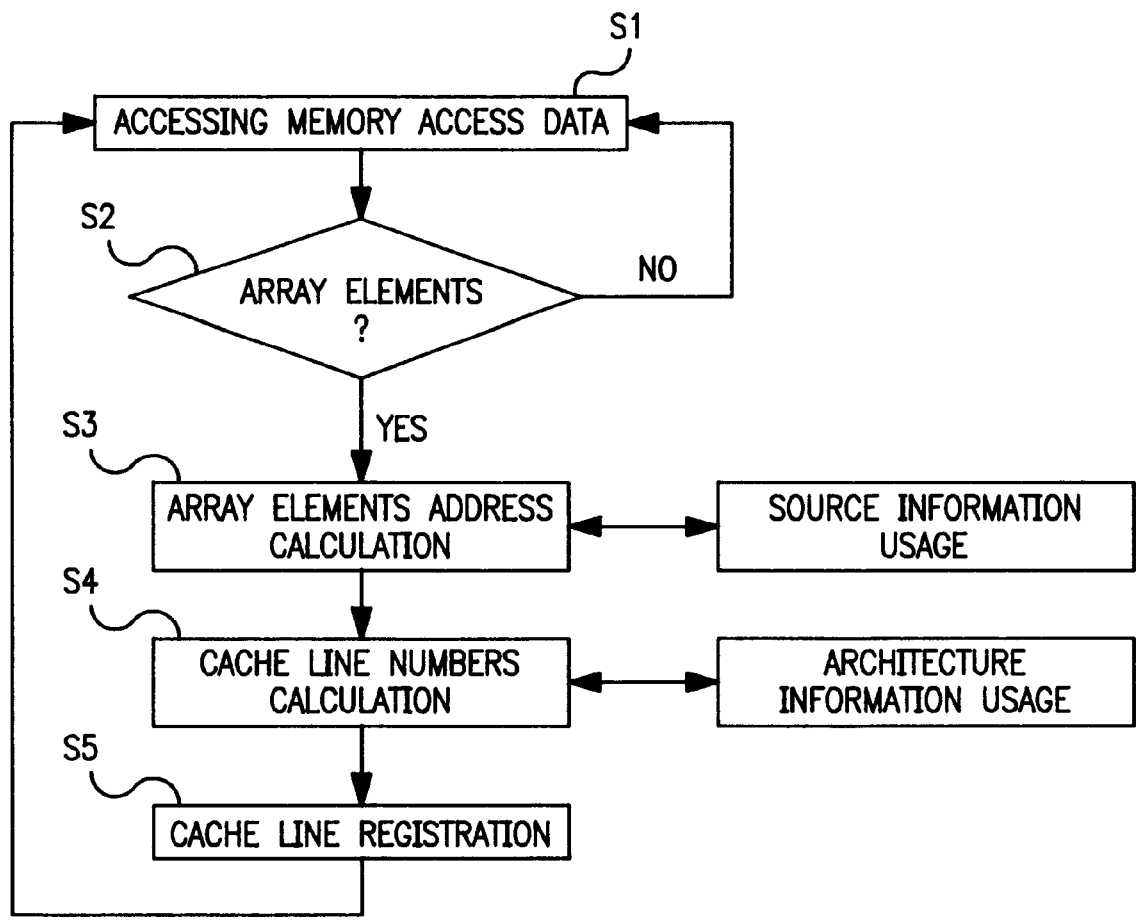
FIG. 8 shows a flowchart of calculating the cache lines numbers of the array elements.

FIG. 8 is a flowchart showing a procedure of calculating cache line numbers of array elements.

At first, memory access data are fetched at step S1. Next, it is determined at step S2 whether or not the fetched memory access data are array elements. When not array elements, the step S1 is reexecuted, and next access data are fetched. When the fetched memory access data are array elements, step S3 is processed.

At step S3, by referring to source information from the information table, array element addresses are calculated byte. At step S4, by referring to the architecture information from the information table, the cache line numbers are calculated by cache access addresses based on the aforementioned expressions (1) and (2). At step S5, calculated cache memory line numbers are registered in the information table, the step S1 is reexecuted, and the procedures are repeated until all memory access data are fetched.

(4) Analyses of confliction relationship in the cache memory

In the case of direct-mapped cache memory, a line of the cache memory becomes a cache memory address. Therefore, in this case, as shown in FIG. 9, array elements F(JX, K, 1), F(JX+1, K, 1), F(JX+2, K, 1), and F(JX, K, 2) are stored in a line 32 of the cache memory.

Here, the remainder of array element F(JX, K, 1) is 1000, and the quotient is 0 (1000/131072), the remainder of array element F(JX+1, K, 1) is 1008, and the quotient is 0 (1008/131072), the remainder of array element F(JX+2, K, 1) is 1016, and the quotient is 0 (1016/131072).

Therefore, array elements F(JX, K, 1), F(JX+1, K, 1), and F(JX+2, K, 1) are identified to be a continuous area since the quotients calculated in expression (1) are the same. This means that when one array element among the above mentioned three arrays elements is stored in a particular line of the cache memory line, the other two array elements are stored at the same time in the same line of the cache memory.

Array elements F(JX, K, 1), F(JX+1, K, 1), F(JX+2, K, 1), and F(JX, K, 2) have different quotients calculated in the expression (1), so they are confliction data in the cache memory.

Similarly, for array element X(JX, K):

397288/131072=quotient: 3, remainder: 4072; for array element Y(JX, K):

528360/131072=quotient: 4, remainder: 4072.

So, array elements X(JX, K) and Y(JX, K) conflict in a line 128 of the cache memory and become confliction data because the quotients from the expression (1) are different.

Figure 10:
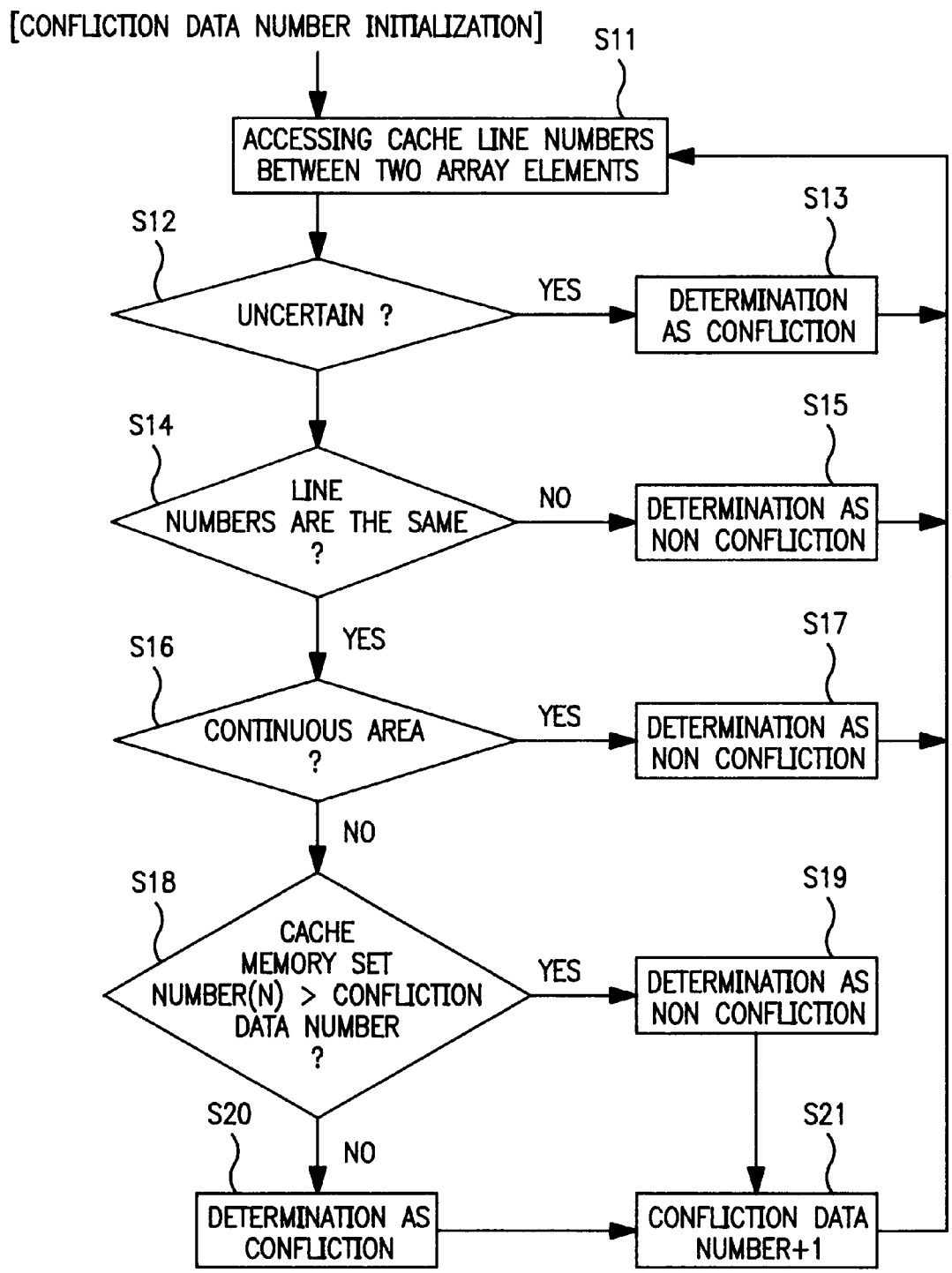
FIG. 10 shows a flowchart of analyzing a conflict relationship in the cache memory.

FIG. 10 is a flowchart for an analysis procedure to check array element confliction in the cache memory. When a cache memory configuration is not a direct mapped cache memory but an N sets associative cache memory, the number of confliction data and the number of sets of the N sets associative cache memory should be considered, since sets in the cache memory may be different even if confliction between array elements occurs.

Here, in this invention, confliction analysis between array elements in the cache memory is carried out immediately after calculating the line number of the cache memory, but can be logically carried out in any phase, only after calculating the line number.

In FIG. 10, at step S11, the cache line numbers for two array elements are detected after initializing the number of confliction data for each line number.

At step S12, it is determined whether or not the cache line numbers of the array elements are uncertain. In the case of uncertainty, it is determined to be a confliction condition (step S13), then step S11 is reexecuted and the processing of the next two array elements is executed. In the case of certainty, the procedure of step S14 is executed.

At step S14, it is determined whether or not detected array element cache line numbers are the same. In the case of not being the same, it is determined to be non confliction (step S15), step S11 is reexecuted and the processing of the next two array elements is executed. In the case of being the same, step S16 is executed.

At step S16, it is determined whether or not the detected array elements form a continuous area. In the case of being a continuous area, it is determined to be non confliction (step S17) and step S11 is reexecuted. In the case of not being a continuous area, step S18 is executed.

At step S18, it is determined whether or not the set number (N) of the cache memory is greater than a confliction data number. When the cache memory set number (N) is greater than the confliction data number, it is determined to be non confliction (step S19), and step S21 is executed. In the case of not being greater, it is determined to be confliction (step S20), then step S21 is reexecuted.

At step S21, 1 is added to the confliction data. Then, the step S11 is reexecuted, and the same procedure is repeated for the next two array elements.

(5) Analysis of overlap of array elements in the real memory address

When two array elements conflict in the cache memory, a cache miss is not made for one of the adjacent elements if the one of adjacent array elements is removed before the confliction occurs. Here, the adjacent elements may not be usually the confliction array elements. In order to move the array element adjacent to the previous array element before the adjacent array elements conflict, overlap of array elements should be analyzed, and it should be ensured that one array element does not overlap with another array element. This is the overlap analysis of the array elements. When an instruction scheduling schedules an instruction to a position where the cache miss does not occur, this overlap analysis is needed.

(6) Procedure of allocating a register to the memory access data causing confliction in the cache memory When allocating a register, different registers should be allocated as for as possible for data loaded from the memory.

(7) Procedure of relocating an instruction for the memory access data causing confliction in the cache memory In the case of the instruction scheduling, instruction relocation is made in order for individual adjacent data for two array elements conflicting in the cache memory to become as close as possible (referring to FIG. 4). In the case of the program example shown in FIG. 2 A, the array element X(JX+1, K) can be fetched without cache miss by loading the array elements X(JX, K) and X(JX+1, K), before loading the array elements Y(JX, K) after executing the loop unrolling.

Figure 11:
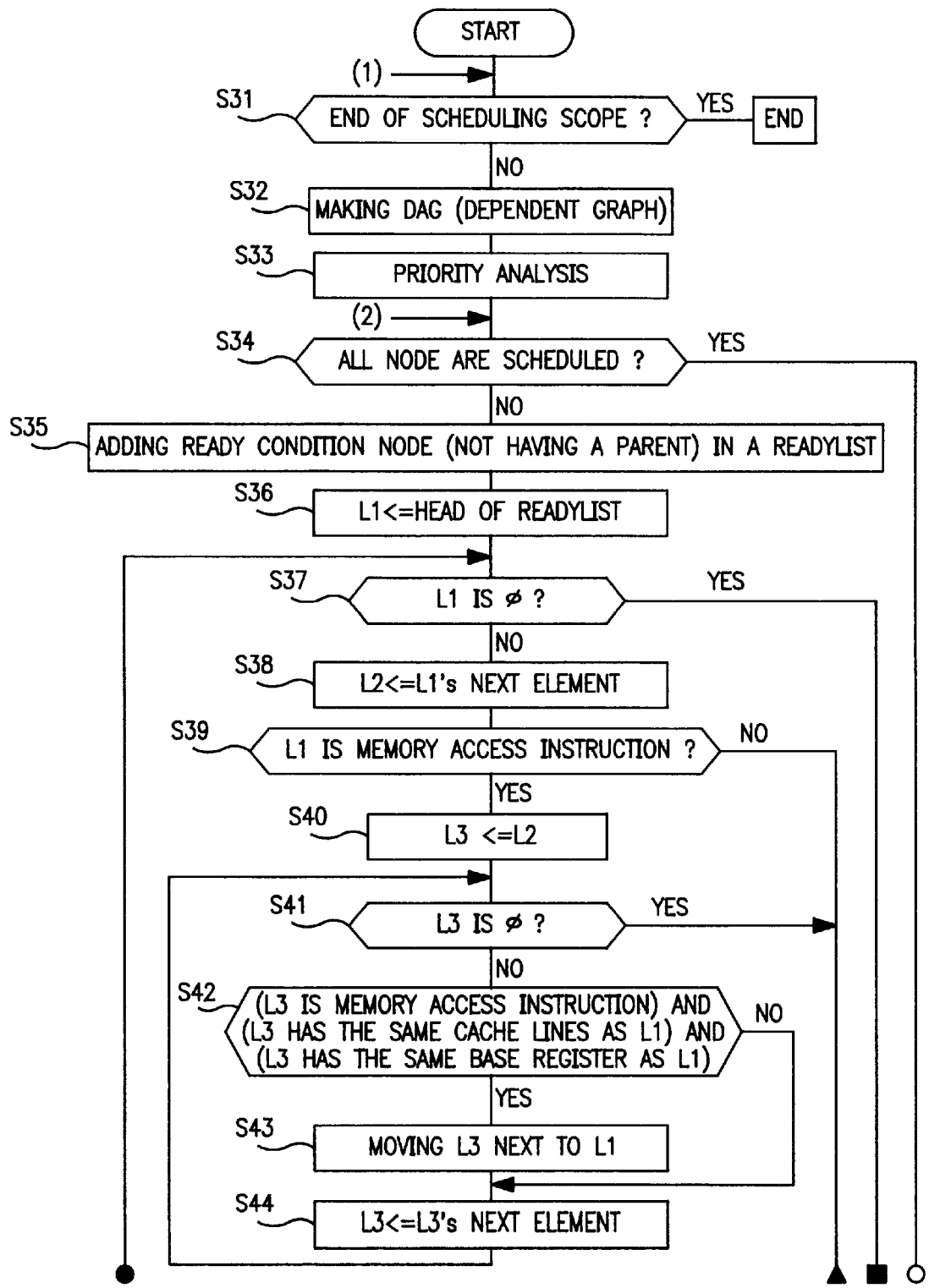
FIG. 11 shows a flowchart of a process of moving adjacent data.
Figure 12:
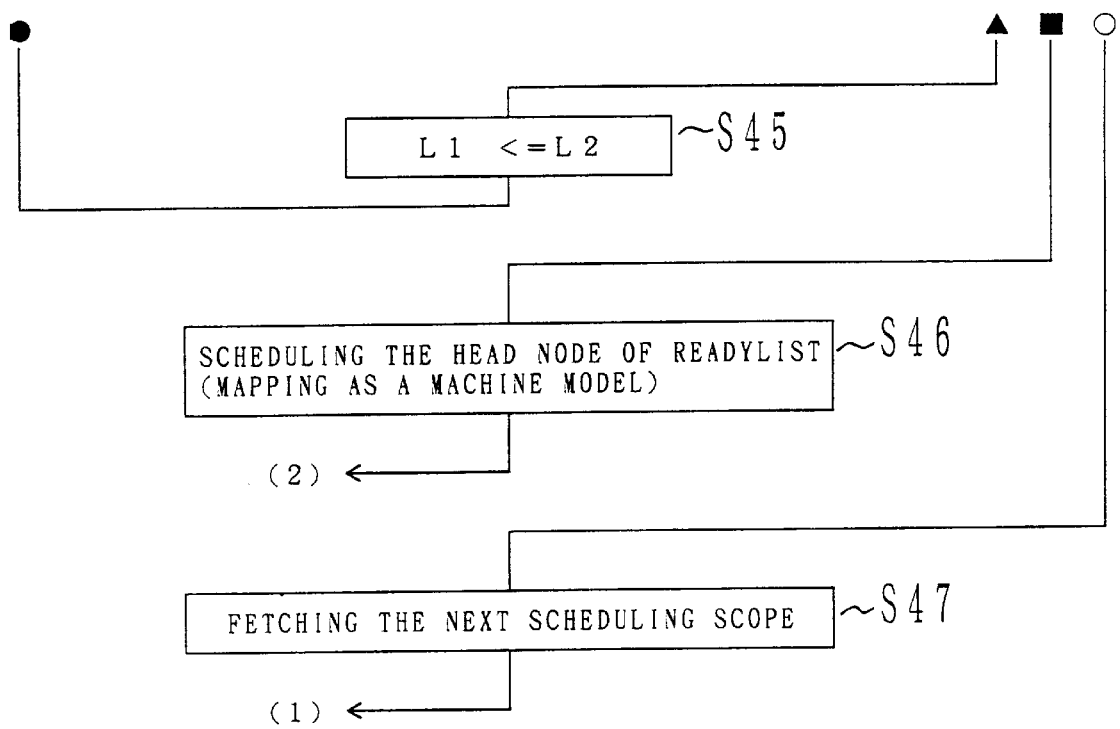
FIG. 12 shows a flowchart of a process of moving adjacent data.

FIG. 11 and FIG. 12 are flowcharts showing relocation procedure for adjacent data.

In FIG. 11, when the end of scheduling scope is not the lowest (S31), a DAG is made (S32) and PRIORITY is analyzed (S33). When all the nodes are not scheduled (34), the node for READY condition is added to a ReadyList (35) and the head of ReadyList is stored in L1 (S36). When L3 is not 0 (S37), the next element of L1 is stored in L2 (S38). When L1 is a memory access instruction (S39), L2 is stored in L3 (S40). When L1 is not 0 (S41), L3 is the memory access instruction, L3 and L1 have the same cache line, and L3 and L1 have the same base (S42), L3 is scheduled next to L1, the next element of L3 is stored in L3 (S44), and step S41 is reexecuted.

Here, when all the nodes are scheduled at the step S34, the next scheduling scope is fetched at step S47 (FIG. 12) and the step S31 is reexecuted.

Further, when L1 is 0 at the step S37, the top node of ReadyList is scheduled (S46) and the step S34 is reexecuted.

Here, L1 is not a memory access instruction at step S39, L2 is stored in L1 (S45), and step S37 is reexecuted.

2. The compiling method for reducing memory access to a continuous area

Next, the preferred embodiment for reducing memory access is explained when a continuous area is considered. There are three items as follows for speeding up a memory access to a continuous area.

(1) Recognizing whether or not to access a continuous area
(2) Recognizing a continuous area alignment
(3) Converting single-precision/double-precision data into pair-load/pair-store Recognition of whether or not it is a continuous area is made by using overlapped information within the loop of source data and memory access data. Here, the following three prerequisites are necessary for analyzing a continuous area alignment.

a) The top of 4-byte array elements should be allocated to the top of the 8-byte alignment data b) The top of 8-byte array elements should be allocated to the top of the 16-byte alignment data c) The distance array elements for analysis is precisely determined by overlapping analysis The pair-load/pair-store is not generated if even one of these three conditions is not met, or a trap of an address exception occurs. For example, this type of trap is generated in the case of architecture precisely investigating pair-load alignment.

Under the above prerequisites, the present optimization procedure for speeding up memory access for a continuous area is explained. FIGS. 13–15 show examples of intermediate texts and source programs to explain optimization by the present invention. FIG. 16 shows generation pattern examples of pair-load/pair-store.

(1) Recognizing whether or not to access a continuous area

In this example, 4-byte data (single precision) are assumed for memory access for a connected area analysis. For 8-byte data (double precision), the same method as for 4-byte data is used for determination.

(a) Allocating an initial number

The initial number is allocated for each array element based on the overlap analysis of the array elements. In FIG. 13, an initial number allocation example is shown. Based on subscript element analysis, it is shown that each array element within the loop shown in the example of FIG. 13 is accessed from the top of the array.

a) Namely, in FIG. 13, subscripts for A(), B() within the loop are stored in a subscript information. In this case, subscript I is stored in the subscript information. Access is not from the top if the initial number is 1, since the value of the initial number+1 of the loop is accessed first in the loop for optimization if I+1 is stored in this subscript information.

b) Next, the array size of A() and B() is stored in a variable information for A and B, so it is understood that the number of elements in the array is defined as a whole number, if the size of one element of A() and B() is known. Here, the size of one element for A() and B() can be determined by showing the type of A() and B() (declared type).

For example, when the size of A() is 400 bytes and the size of one element of A() is 4 bytes, it is determined that the number of the array elements that has been stored is 100 because 400/4=100.

c) By calculating the number of the array elements, it is determined whether or not the array is accessed from the top to the bottom by checking out the array scope used in the loop.

The initial number of a loop index, end number, and iteration number, are stored in a loop information as source information, at the step of identifying the loop. In the above described example, this corresponds to the loop as

DO I=1, 100 . . . CONTINUE, and the loop initial number: 1, the loop end number 100, and the iteration number: 100, have already been stored.

Here, it is determined that all array elements are accessed from the top to the bottom in this loop by comparing the array element number, determined in b), : 100 with the loop iteration number: 100 (all data are accessed because the loop repeats 100 times).

```
REAL A(100), B(100)
DO I=2, 100
    A(I) = 0
    B(I) = 0
CONTINUE
```

In the above cases, a), b), and c) are explained as follows:
a) Array element subscript is I.
b) The size of one element is 4 bytes because of REAL type if the size of array elements is 400 bytes. Therefore, it is determined to be an array of 400/4=100 elements.
c) The initial number of the loop index is 2, the end number: 100, so the iteration number is 99. The array has 100 elements from b), so one element access cannot be made. Therefore, in this case, it is determined not to be accessed from the top within this loop.

When allocating the initial number, with the top of the array being a basic point 0, the distance from the basic point is allocated as the initial number. In the above example, the initial number is 0 for A(I) and B(I). Here, [STORE AXD (A), 0] in the intermediate language means an instruction for storing the number 0 in the array element A.

(b) Allocating continuous numbers

When applying the loop unrolling optimization, each array element is copied for the number of unrollings. A sequential number is allocated to the array elements copied when expand the loop. FIG. 14 shows an example of unrolled the loop at two times for the source program shown in FIG. 13.

The element A(I+1) next to A(I) is generated by the loop unrolling. In this case, the distance between the elements from A(I) is allocated as the continuous number for the loop unrolling. In the example of FIG. 14, 1 is allocated to A(I+1) as the continuous number since the distance from the origin 0 is 1. Similarly, the continuous number 1 is allocated to the array element B(I+1).

Next, another example is shown in FIG. 15. The initial number has already been assigned as shown in FIG. 15 A.

In the source program shown in FIG. 15 A, when applying the loop unrolling at the two times, a copy of A(I+3) is generated by the loop unrolling for A(I+1). The continuous number becomes 1+2=3 because the distance from the origin is +2.

The copy of A(I+4) is generated by the loop unrolling for A(I+2), so the continuous number becomes 2+2=4 because the distance from the origin is +2.

(2) Recognizing a continuous area alignment

If the initial number is an even number in the determination for a continuous area when alignment is considered, the memory access data are shown to be the top of the 8-byte or 16-byte alignment. From this point, the continuous area can be recognized when alignment is considered, as the pair of [even number, even number+1] array elements is the continuous area including the initial-number/continuous-number.

For example, in the program shown in FIG. 14, the initial number of A(I) of the intermediate language is 0 and the continuous number of A(I+1) is 1, so [A(I), A(I+1)] is determined as a continuous area. Similarly, [B(I), B(I+1)] is determined as a continuous area.

Further, in the example shown in FIG. 15 B, the array elements of [A(I+2), A(I+3)] become a continuous area since A(I+2) and A(I+3) correspond to [even number, even number+1] based on the initial number and the continuous number of the intermediate language. It is determined that a continuous area does not exist for A(I+1) and A(I+4) when alignment is considered.

(3) Converting single-precision/double-precision data into pair-load/pair-store

Memory access data for generating the pair-load/pair-store are determined by the initial number and the continuous number. An interface is necessary, which informs, for allocating registers, that the pair-register is necessary for the intermediate language corresponding to the load/store, in order to generate the pair-load/pair-store for the continuous memory access data. Because of this, a compound temporary name is allowed for the intermediate language (LOAD/STORE) to represent memory access.

Here, there are just three patterns as a generated pair-load/pair-store as shown in FIG. 16. The pair-load/pair-store 8 determines an appropriate pattern among three patterns.

Pattern 1 shown in FIG. 16 A is for pair-loading an 8 (or 16)-byte continuous area and storing 4 (or 8)-bytes by 4 (or 8)-bytes respectively.

Pattern 2 shown in FIG. 16 B is for loading 4 (or 8)-bytes by 4 (or 8)-bytes respectively, and pair-storing an 8 (or 16)-byte continuous area.

Pattern 3 shown in FIG. 16 C is for pair-loading an 8 (or 16)-byte continuous area and pair-storing an 8 (or 16)-byte continuous area.

(4) Procedure for allocating registers

In the register allocation procedure, the pair register is assigned for memory access operation having a compound temporary name (intermediate text having plural definition operands in one definition operand) in an operand.

(5) Procedure for code generation

In the code generation procedure, an instruction of the double-precision type LOAD/double-precision type STORE (or, quadruple-precision LOAD/quadruple-precision STORE) is generated.

Figure 17:
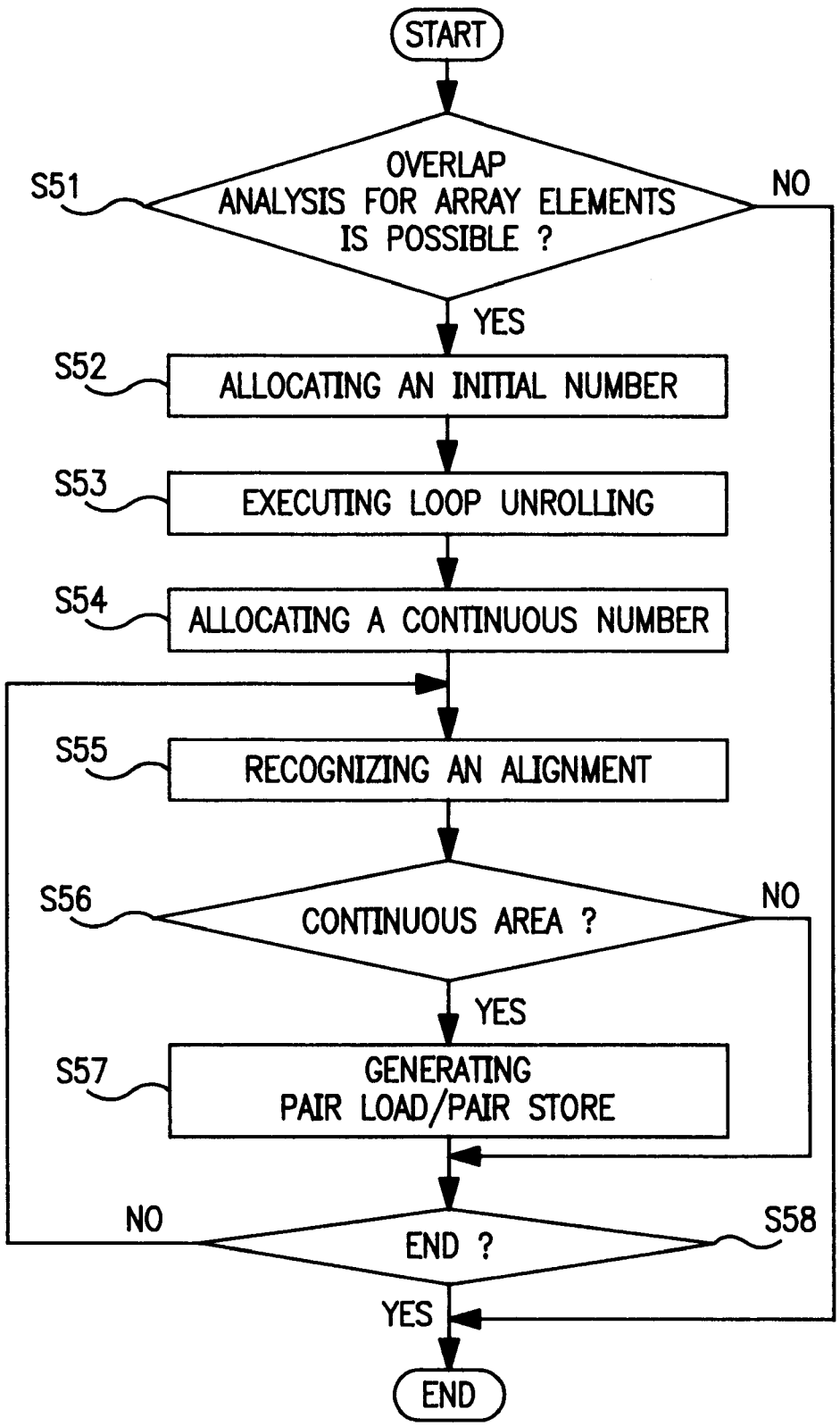
FIG. 17 shows a flowchart of an optimization of a memory access to the continuous area in accordance with a compiling method for reducing the time of memory accesses to the continuous area.

FIG. 17 is a flowchart showing the optimization procedure for the connected area (compiling method for reducing a memory access to the continuous area).

It is determined whether or not array element overlap analysis is possible at step S51 in FIG. 17. When the array element overlap analysis is possible, the procedure at step S52 is executed. When the array element overlap analysis is impossible, the present optimization procedure is terminated.

An initial number is allocated for each array element at step S52. The loop development is made by a loop unrolling at step S53. Here, the loop unrolling is not necessary if loop unrolling has already been made before the present optimization procedure. At step S54 a continuous number is assigned for the array elements copied during the loop unrolling.

The recognition of alignment is made at step S55.

Whether or not it is a continuous area is determined based on the initial number and the continuous number, at step S56. When it is recognized as a continuous area, the procedure at step S57 is executed. When it is not recognized as a continuous area, the procedure at step S58 is executed.

At step S57, memory access data for generating the pair-load/pair-store are determined based on the initial number and the continuous number, one pattern among three patterns for generating the pair-load/pair-store is determined, and the pair-load or the pair-store, or both of them, is generated.

It is determined whether or not the procedure for processing the array elements in all continuous areas is finished, and the present optimization procedure is terminated when this is finished. When it is not finished, the step S55 is reexecuted, and the procedure for the next array elements is executed similarly.

In the above description, two optimization examples are explained separately, which are a method of reducing the number of cache miss and a method of reducing memory access to a continuous area. Further, it is needless to say that better effective object program can be generated by applying both of these concurrently.

According to the present invention, the number of cache miss for memory access data can be reduced. Accordingly, a program can be executed with higher speed by reducing the effect of the cache miss.

Further, memory access, as a bottle-neck for a RISC processor etc., can be reduced by both fetching data from a continuous area and writing to a continuous area. The program can also be executed at a higher speed based on this pair-load/pair-store.

What is claimed is:

1. An apparatus for compiling programs for execution in a computer having a cache memory, said apparatus comprising:

memory access data collection means for collecting memory access data in an optimization process for compiling a program;

confliction data analysis means for analyzing confliction relationships in a cache memory between the collected memory access data;

memory access data overlap analysis means for determining, based on a confliction data analysis result, whether to relocate an instruction for memory access data conflicting in said cache memory;

instruction relocation means for relocating an instruction to eliminate a cache miss for the memory access data conflicting in the cache memory;

continuous area generation means for increasing the amount of memory access data for a continuous area by loop unrolling in the optimization process for compiling the program;

means for collecting the memory access data after increasing said memory access data for said continuous area by said memory access data collection means; and means for aligning instructions for the memory access data for the continuous area by said instruction relocation means.

2. The apparatus according to claim 1, wherein said confliction data analysis means includes means for analyzing confliction relationships in the cache memory between the collected memory access data based on specified architecture information for a computer on which the program is to be run after compilation, whereby confliction data analysis can be performed for plural types of cache memory configurations.

3. An apparatus for compiling a program for execution in a computer having a cache memory, said apparatus comprising:

continuous area recognition means for recognizing, in a compile optimization process for the program, memory access data for a continuous area of memory;

alignment detecting means for detecting memory access data alignment for the recognized continuous area; and pair-load/pair-store means for generating an instruction for an operation selected from storing and loading plural memory access data for the continuous area as one memory access data, based on an alignment detecting result.

4. An apparatus for compiling programs for execution in a computer having a cache memory, said apparatus comprising:

continuous area generation means for increasing an amount of memory access data for a continuous area by loop unrolling in an optimization process for compiling a program;

memory access data collection means for collecting memory access data;

confliction data analysis means for analyzing confliction relationships in a cache memory between the collected memory access data;

memory access data overlap analysis means for analyzing, based on a confliction data analysis result, whether to relocate an instruction for memory access data conflicted in said cache memory;

instruction relocation means for relocating instructions to reduce cache misses for the memory access data conflicting in the cache memory based on a memory, access data overlap analysis result;

continuous area recognition means for recognizing the memory access data for the continuous area;

alignment detecting means for detecting memory access data alignment for the recognized continuous area; and pair-load/pair-store generation means for generating an instruction for an operation selected from loading and storing plural memory access data for the continuous area as one memory access data, based on an alignment detecting result.

5. A method of program compiling for a computer having a cache memory, the method comprising the steps of:

collecting memory access data in an optimization process for compiling a program;

confliction data analysis means for analyzing confliction relationships in a cache memory between the collected memory access data;

performing memory access data overlap analysis to determine, based on a confliction data analysis result, whether to relocate an instruction for memory access data conflicting in said cache memory;

relocating the instruction when a result of the memory access overlap analysis indicates to relocate the instruction;

increasing the amount of memory access data for a continuous area by loop unrolling in the optimization process for compiling the program:

collecting the memory access data after increasing said memory access data for said continuous area; and aligning instructions for the memory access data for the continuous area.

6. A method of program compiling for a computer having a cache memory, comprising the steps of:

recognizing memory access data for a continuous area in a compile optimization process for a program;

detecting memory access data alignment for the recognized continuous area; and generating an instruction for an operation selected from storing and loading plural memory access data for the continuous area as one memory access data, based on an alignment detecting result.

7. A method of program compiling for a computer having a cache memory, comprising the steps of:

increasing an amount of memory access data for a continuous area by loop unrolling in an optimization process for compiling a program;

collecting memory access data;

analyzing confliction relationships in a cache memory between the collected memory access data;

analyzing, based on a confliction data analysis result, whether to relocate an instruction for memory access data conflicted in the cache memory;

relocating the instruction based on a memory access data overlap analysis result;

recognizing the memory access data for the continuous area;

detecting memory access data alignment for the recognized continuous area; and generating an instruction for an operation selected from storing and loading plural memory access data for the continuous area as one memory access data, based on an alignment detecting result.

* * * * *